United States Patent
Watanabe

(10) Patent No.: US 10,225,459 B2
(45) Date of Patent: Mar. 5, 2019

(54) IMAGE REPRODUCING APPARATUS THAT SELECTS IMAGE FROM MULTIPLE IMAGES AND REPRODUCES SAME, METHOD OF CONTROLLING IMAGE REPRODUCING APPARATUS, AND STORAGE MEDIUM

(71) Applicant: CANON KABUSHIKI KAISHA, Tokyo (JP)

(72) Inventor: Hitoshi Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/580,670

(22) Filed: Dec. 23, 2014

(65) Prior Publication Data

US 2015/0186375 A1    Jul. 2, 2015

(30) Foreign Application Priority Data

Dec. 26, 2013  (JP) ................................. 2013-269331

(51) Int. Cl.
H04N 5/225 (2006.01)
H04N 5/232 (2006.01)
H04N 1/00 (2006.01)
G06F 17/30 (2006.01)

(52) U.S. Cl.
CPC ... *H04N 5/23216* (2013.01); *G06F 17/30265* (2013.01); *H04N 1/00453* (2013.01); *H04N 5/23293* (2013.01); *H04N 2201/3214* (2013.01)

(58) Field of Classification Search
CPC .......... H04N 5/23216; H04N 1/00453; H04N 5/23293; H04N 2201/3214; G06F 17/30265; G06F 17/30244; G06F 17/30268
See application file for complete search history.

(56) References Cited

U.S. PATENT DOCUMENTS

| | | | |
|---|---|---|---|
| 9,286,360 B2 | 3/2016 | Morimoto et al. | |
| 2002/0188602 A1* | 12/2002 | Stubler | G06F 17/30256 |
| 2003/0050982 A1* | 3/2003 | Chang | G06F 17/30265 |
| | | | 709/206 |

(Continued)

FOREIGN PATENT DOCUMENTS

| | | |
|---|---|---|
| JP | 2006085632 A | 3/2006 |
| JP | 2009224862 A | 10/2009 |

(Continued)

OTHER PUBLICATIONS

Office Action Issued in Japanese Appln. No. 2013269331 dated Nov. 14, 2017.

*Primary Examiner* — Twyler L Haskins
*Assistant Examiner* — Dwight Alex C Tejano
(74) *Attorney, Agent, or Firm* — Rossi, Kimms & McDowell LLP

(57) ABSTRACT

An image reproducing apparatus that is capable of easily reproducing image data intended for viewing. A read-out unit reads out a plurality of images recorded in a recording medium. A control unit determines target images among the plurality of images based on a reference date. The control unit specifies a shooting date on which a predetermined number or greater number of images were taken around the reference date and determines images taken on the specified shooting date as the target images.

17 Claims, 5 Drawing Sheets

| NUMBER OF SHOTS | 31 | 28 | 28 | 31 | 34 | 30 | 10 |
|---|---|---|---|---|---|---|---|
| SHOOTING DATE | M-2 | M-1 | M (REFERENCE DATE) | M+1 | M+2 | M+3 | M+4 |

EVENT TIME PERIOD →

(56) References Cited

U.S. PATENT DOCUMENTS

| | | | |
|---|---|---|---|
| 2004/0208365 A1* | 10/2004 | Loui | G06F 17/3025 382/171 |
| 2005/0027712 A1* | 2/2005 | Gargi | G06F 17/30265 |
| 2005/0044066 A1* | 2/2005 | Hooper | G06F 17/30265 |
| 2006/0139709 A1* | 6/2006 | Bifano | G06F 17/30265 358/527 |
| 2006/0294096 A1* | 12/2006 | Kraus | G06F 17/30265 |
| 2007/0081088 A1* | 4/2007 | Gotoh | G06F 17/30265 348/333.01 |
| 2008/0205771 A1* | 8/2008 | Kraus | G06F 17/30247 382/224 |
| 2014/0093175 A1* | 4/2014 | Morimoto | G06F 17/30554 382/195 |
| 2014/0258297 A1* | 9/2014 | Davari | G06F 17/30247 707/737 |

FOREIGN PATENT DOCUMENTS

| | | | |
|---|---|---|---|
| JP | 2010050887 A | 3/2010 |
| JP | 2012194800 A | 10/2012 |
| JP | 2014071702 A | 4/2014 |

* cited by examiner

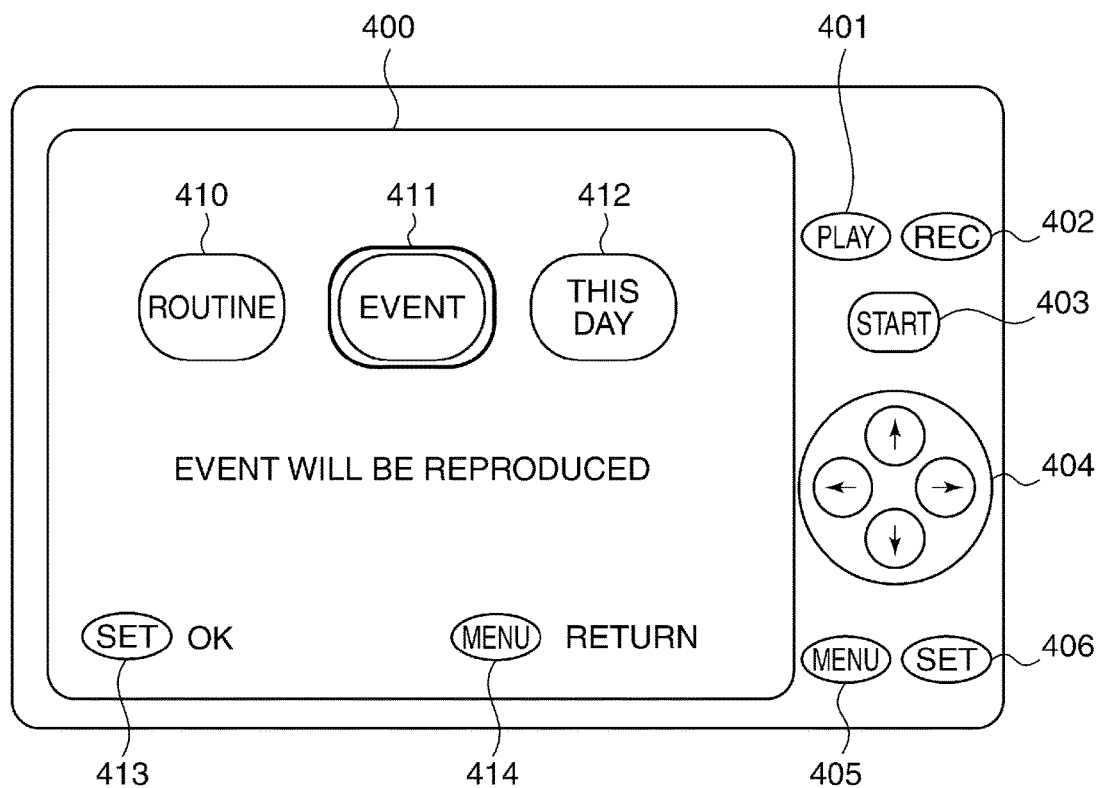

FIG. 6A

| NUMBER OF SHOTS | 31 | 28 | 34 | 31 | 34 | 30 | 10 |
|---|---|---|---|---|---|---|---|
| SHOOTING DATE | M-3 | M-2 | M-1 | M (REFERENCE DATE) | M+1 | M+2 | M+3 |

EVENT TIME PERIOD →

FIG. 6B

| NUMBER OF SHOTS | 31 | 28 | 28 | 31 | 34 | 30 | 10 |
|---|---|---|---|---|---|---|---|
| SHOOTING DATE | M-2 | M-1 | M (REFERENCE DATE) | M+1 | M+2 | M+3 | M+4 |

EVENT TIME PERIOD →

FIG. 6C

| NUMBER OF SHOTS | 10 | 28 | 10 | 10 | 28 | 10 | 10 |
|---|---|---|---|---|---|---|---|
| SHOOTING DATE | M-3 | M-2 | M-1 | M (REFERENCE DATE) | M+1 | M+2 | M+3 |

ROUTINE TIME PERIOD →

IMAGE REPRODUCING APPARATUS THAT SELECTS IMAGE FROM MULTIPLE IMAGES AND REPRODUCES SAME, METHOD OF CONTROLLING IMAGE REPRODUCING APPARATUS, AND STORAGE MEDIUM

BACKGROUND OF THE INVENTION

Field of the Invention

The present invention relates to an image reproducing apparatus, a method of controlling the image reproducing apparatus, and a storage medium, and in particular to an image reproducing apparatus that, at the time of image reproduction, selects an image from a plurality of images and reproduces the same.

Description of the Related Art

In general, image pickup apparatuses such as digital cameras are equipped with an image reproducing apparatus for reproducing images after shooting. In this type of image pickup apparatuses, images obtained as a result of shooting are stored as digital data (image data). By increasing the capacity of a recording medium such as a memory card for recording image data, a large amount of image data can be recorded.

For this reason, when a user views image data recorded in a recording medium, searching for and reproducing desired image data may take a lot of time and effort.

Some conventional image reproducing apparatuses put together image files recorded on the same date into one event. These image reproducing apparatuses set a background image and background music according to attribute information on the event and display images as a slide show (see Japanese Laid-Open Patent Publication (Kokai) No. 2006-85632).

In an image reproducing apparatus described in Japanese Laid-Open Patent Publication (Kokai) No. 2006-85632, for example, image files recorded on the same date are put together into one event. For this reason, image data that is not taken on a date designated by a user is exempted from reproduction. Therefore, the user has to remember an exact date on which image data desired to be reproduced was taken or generated, and when he or she does not remember it at the time of reproducing image data intended for viewing, it takes a lot of time to reproduce image data intended for viewing due to much trial and error.

SUMMARY OF THE INVENTION

The present invention provides an image reproducing apparatus that are capable of easily reproducing image data intended for viewing, a method of controlling the image reproducing apparatus, and a storage medium.

Accordingly, a first aspect of the present invention provides an image reproducing apparatus comprising a read-out unit configured to read out a plurality of images recorded in a recording medium, and a control unit configured to determine target images among the plurality of images based on a reference date, wherein the control unit specifies a shooting date on which a predetermined number or greater number of images were taken around the reference date and determines images taken on the specified shooting date as the target images.

Accordingly, a second aspect of the present invention provides an image reproducing apparatus comprising a selection unit configured to select one image from a plurality of images recorded in a recording medium, and a reference date setting unit configured to set a shooting date on which the selected images was taken as a reference date, wherein in a case where a predetermined number or greater number of images taken on the reference date and the predetermined number or greater number of images taken on dates adjacent to the reference date are included in the plurality of images recorded in the recording medium, the images taken on the reference date and the images taken on the dates adjacent to the reference date are set as images relating to the selected image.

Accordingly, a third aspect of the present invention provides an image reproducing apparatus comprising a selection unit configured to select one image from a plurality of images recorded in a recording medium, and a determination unit configured to determine an event time period relating to the selected image based on a shooting date on which the selected image was taken, wherein in a case where a predetermined number or greater number of images taken on the shooting date of the selected image are included in the plurality of images recorded in the recording medium, the determination unit determines that a time period including the shooting date of the reference image and another shooting date, which is consecutive to the shooting date of the reference image and on which the predetermined number or greater number of images were taken, as the event time period.

Accordingly, a fourth aspect of the present invention provides a control method for an image reproducing apparatus, comprising a read-out step of reading out a plurality of images recorded in a recording medium, and a control step of determining target images among the plurality of images based on a reference date, wherein in the control step, a shooting date on which a predetermined number or greater number of images were taken around the reference date is specified, and images taken on the specified shooting date are determined as the target images.

Accordingly, a fifth aspect of the present invention provides a control method for an image reproducing apparatus, comprising a selection step of selecting one image from a plurality of images recorded in a recording medium, and a reference date setting step of setting a shooting date on which the selected images was taken as a reference date, wherein in a case where a predetermined number or greater number of images taken on the reference date and the predetermined number or greater number of images taken on dates adjacent to the reference date are included in the plurality of images recorded in the recording medium, the images taken on the reference date and the images taken on the dates adjacent to the reference date are set as images relating to the selected image.

Accordingly, a sixth aspect of the present invention provides a control method for an image reproducing apparatus, comprising a selection step of selecting one image from a plurality of images recorded in a recording medium, and a determination step of determining an event time period relating to the selected image based on a shooting date on which the selected image was taken, wherein in a case where a predetermined number or greater number of images taken on the shooting date of the selected image are included in the plurality of images recorded in the recording medium, the determination unit determines that a time period including the shooting date of the reference image and another shooting date, which is consecutive to the shooting date of the reference image and on which the predetermined number or greater number of images were taken, as the event time period.

Accordingly, a seventh aspect of the present invention provides a non-transitory computer-readable storage medium storing a program for causing a computer to implement a control method for an image reproducing apparatus, the control method comprising a read-out step of reading out a plurality of images recorded in a recording medium, and a control step of determining target images among the plurality of images based on a reference date, wherein in the control step, a shooting date on which a predetermined number or greater number of images were taken around the reference date is specified, and images taken on the specified shooting date are determined as the target images.

Accordingly, an eighth aspect of the present invention provides a non-transitory computer-readable storage medium storing a program for causing a computer to implement a control method for an image reproducing apparatus, the control method comprising a selection step of selecting one image from a plurality of images recorded in a recording medium, and a reference date setting step of setting a shooting date on which the selected images was taken as a reference date, wherein in a case where a predetermined number or greater number of images taken on the reference date and the predetermined number or greater number of images taken on dates adjacent to the reference date are included in the plurality of images recorded in the recording medium, the images taken on the reference date and the images taken on the dates adjacent to the reference date are set as images relating to the selected image.

Accordingly, a ninth aspect of the present invention provides a non-transitory computer-readable storage medium storing a program for causing a computer to implement a control method for an image reproducing apparatus, the control method comprising a selection step of selecting one image from a plurality of images recorded in a recording medium, and a determination step of determining an event time period relating to the selected image based on a shooting date on which the selected image was taken, wherein in a case where a predetermined number or greater number of images taken on the shooting date of the selected image are included in the plurality of images recorded in the recording medium, the determination unit determines that a time period including the shooting date of the reference image and another shooting date, which is consecutive to the shooting date of the reference image and on which the predetermined number or greater number of images were taken, as the event time period.

According to the present invention, when it is determined that a reference date is a prospective event date, and at least one of a date before the reference date and a date after the reference date is a prospective event date, a time period for which prospective event dates are successive is assumed as an event time period, and images of which shooting dates are included in the event time period are reproduced and displayed. Thus, when a reference date is set, an event time period is set according to the reference date, and an image group corresponding to the event time period is extracted. This enables a user to easily reproduce image data intended for viewing.

Further features of the present invention will become apparent from the following description of exemplary embodiments (with reference to the attached drawings).

BRIEF DESCRIPTION OF THE DRAWINGS

FIG. 4 is a diagram showing an arrangement of data managed by an attribute management unit in FIG. 1.

FIG. 5 is a view showing an exemplary user interface screen displayed on a display unit of the camera in FIG. 1.

FIGS. 6A to 6C are views useful in explaining exemplary results of the event determination process carried out in the camera in FIG. 1, in which FIG. 6A is a view showing a first example of event determination results, FIG. 6B is a view showing a second example of event determination results, and FIG. 6C is a view showing a third example of event determination results.

DESCRIPTION OF THE EMBODIMENTS

The present invention will now be described in detail with reference to the drawings showing an embodiment thereof.

It should be noted that functional blocks in the present embodiment described hereafter should not necessarily be individual pieces of hardware. Namely, for example, functions of some functional blocks may be performed by a single piece of hardware. Also, functions of one functional block or functions of a plurality of functional blocks may be performed by some pieces of hardware coordinating with each other. Functions of functional blocks may be performed by a computer program expanded on memory by a CPU.

It should be noted that in the following description, an image pickup apparatus is taken as an example of an image reproducing apparatus, but any apparatuses may be used as long as they are capable of reproducing a plurality of moving images or still images or both. For example, the present invention may be applied to a cellular phone, a smartphone, a tablet information terminal, a notebook information terminal, and a computer.

Figure 1:
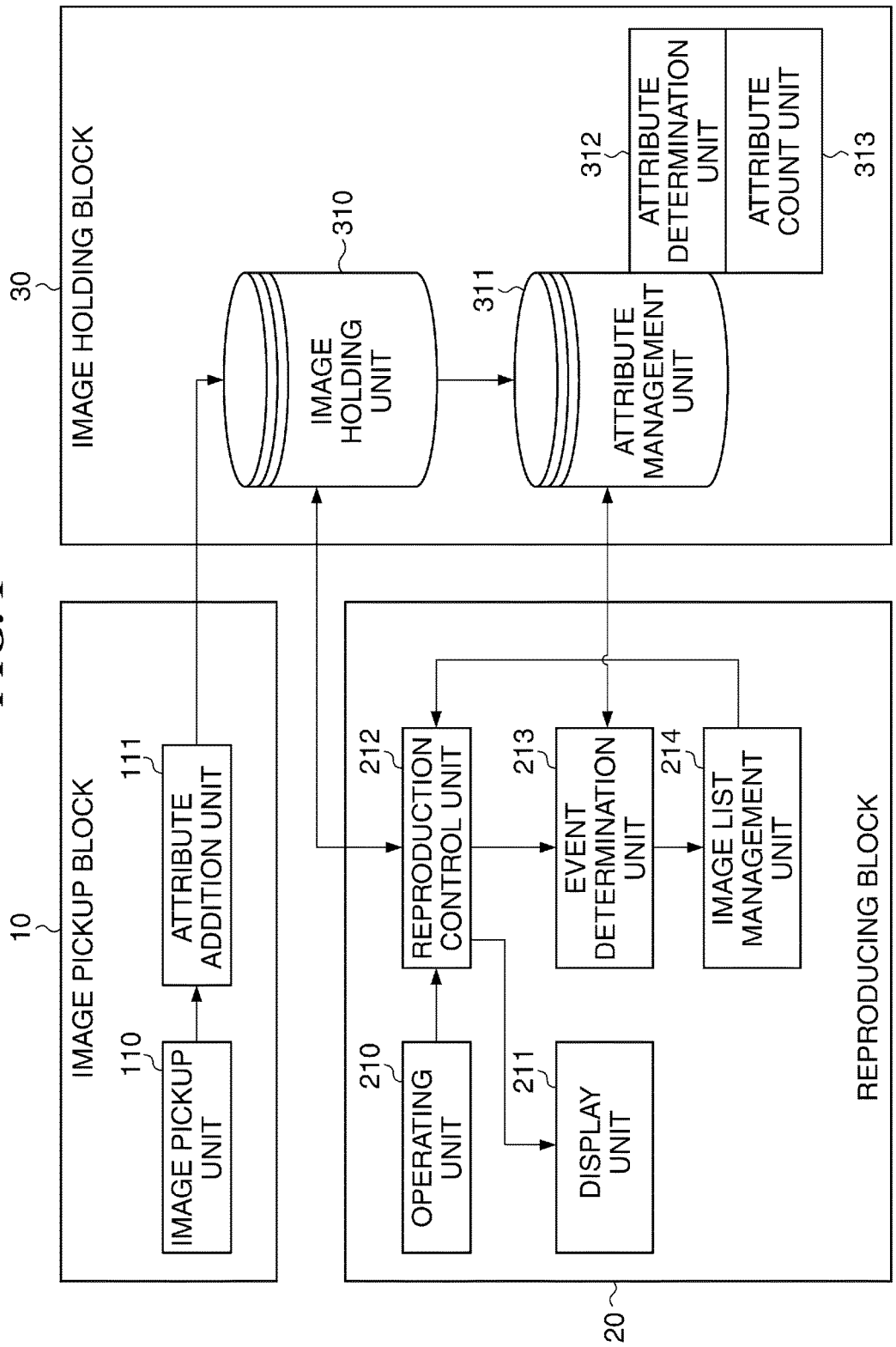
FIG. 1 is a block diagram showing an exemplary image pickup apparatus having an image reproducing apparatus according to an embodiment of the present invention.

FIG. 1 is a block diagram showing an exemplary image pickup apparatus having an image reproducing apparatus according to an embodiment of the present invention. The image pickup apparatus in FIG. 1 is, for example, a digital camera (hereafter referred to merely as the camera) and has an image pickup block 10, a reproducing block 20, and an image holding block 30. The image pickup apparatus also has a control unit comprised of, for example, a CPU and a memory for use in providing centralized control of these blocks.

The image pickup block 10 has an image pickup unit 110 and an attribute addition unit 111, and the image holding block 30 has an image holding unit 310 and an attribute management unit 311. The image pickup unit 110 takes an image of a subject and outputs image data. The image data is supplied to the attribute adding unit 111, which in turn adds attributes (also referred to as attribute information) to the image data. It should be noted that attributes mean, for example, a shooting date and time and shooting conditions. The image data with attributes added thereto is sent as a single file to the image holding block 30 and stored in the image holding unit 310.

The image holding unit 310 is, for example, a recording medium such as an external memory card. When image data is to be newly stored in the image holding unit 310, attributes thereof are sent to and managed by the attribute management unit 311. It should be noted that attribute information should not be separately managed only by the attribute management unit 311 but attribute information may be recorded in a file header of an image file (that is, image data).

The attribute management unit 311 has an attribute determination unit 312 and an attribute count unit 313. The attribute determination unit 312 classifies attributes added to image data. Here, in particular, a shooting date and time is used as a main attribute, but attributes may be classified according to shooting conditions or the like. In place of the attribute determination unit 312 and the attribute count unit 313, the control unit may carry out the same process.

The attribute count unit 313 counts the number of image data with respect to each of attributes classified by the attribute determination unit 312. As a result, the attribute count unit 313 finds the number of image data having the same attribute in image data stored in the image holding unit 310.

The attribute management unit 311 associates pointers, which are for use in accessing image data stored in the image holding unit 310, and attributes with each other and holds them as a management file separately from an image file.

The reproducing block 20 has an operating unit 210, a display unit 211, a reproduction control unit 212, an event determination unit 213, and an image list management unit 214.

Figure 2:
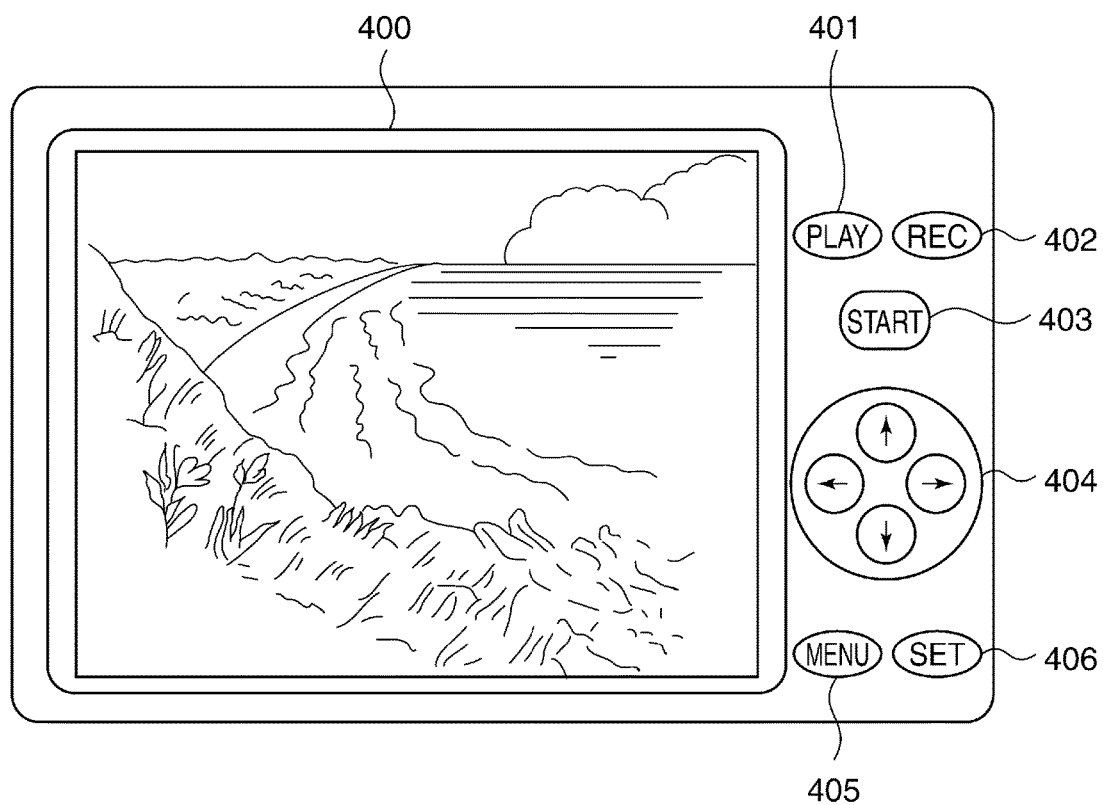
FIG. 2 is a view showing an appearance of a camera in FIG. 1 as seen from behind.

FIG. 2 is a view showing an appearance of the camera in FIG. 1 as seen from behind. As shown in the figure, the operating unit 210 has buttons placed on a rear side of the camera. A PLAY button 401 and a REC button 402 are for use in switching between a shooting mode and a reproducing mode. A START button 403 is for use in starting a function defined by a mode of the camera (for example, the shooting mode or the reproducing mode). A cross button 404 has four buttons, i.e. right, left, up, and down buttons. A MENU button 405 is for use in displaying an operation menu defined by a mode of the camera and deleting the operation menu. A SET button 406 is for use in determining an item selected on a menu or other screen.

A menu is displayed on the display unit 211, and an image is displayed on it when the image is reproduced. Further, the display unit 211 is used as a viewfinder during shooting. It should be noted that the display unit 211 in FIG. 1 is illustrated as a display unit 400 in FIG. 2, and the display unit 400 is disposed on the rear side of the camera.

The reproduction control unit 212 controls operation of the camera in the reproducing mode. Namely, the reproduction control unit 212 manages operating conditions of the camera in the reproducing mode and gives necessary instructions to components of the camera in accordance with operations performed on the operating unit 210. When the camera is started in the reproducing mode, the reproduction control unit 212 obtains latest one image data from the image holding unit 310. The reproduction control unit 212 then sends the image data to the display unit 211 and displays it as an image on the display unit 211.

When the left button of the cross button 404 provided in the operating unit 210 is depressed, the reproduction control unit 212 obtains, from the image holding unit 310, image data one image before the image being currently displayed. The reproduction control unit 212 sends the image data to the display unit 211 and displays it as an image on the display unit 211. Namely, the reproduction control unit 212 selectively reproduces and displays images on the display unit 211.

On the other hand, when the right button of the cross button 404 provided in the operating unit 210 is depressed, the reproduction control unit 212 obtains, from the image holding unit 310, image data one image after the image being currently displayed. The reproduction control unit 212 then sends the image data to the display unit 211 and displays it as an image on the display unit 211.

The event determination unit 213 requests necessary data from the attribute management unit 311 under the control of the reproduction control unit 212 and performs event determination. In accordance with an event determination result obtained by the event determination unit 213, the image list management unit 214 manages an image list. The image list management unit 214 then notifies the reproduction control unit 212 of its management status (that is, the image list).

As described above, when viewing image data stored in the image holding unit 310, it is possible to successively view the image data. However, when there is a number of image data, it may take a lot of time to reach image data which a user intends to view.

If image data intended for viewing by the user is narrowed down, for example, by date, the procedure of operation or the like will be made easier to some extent, but to collectively view image data relating to a travel over a plurality of consecutive days, the procedure of operation will take a lot of time. Further, as for designation using a date, ambiguous designation such as a travel in "those days" is difficult, and it is necessary to designate an exact date.

To improve this point, in the camera shown in FIG. 1, by designating one image data or image data taken in "those days" from a group of image data intended for viewing, an image data group relating to an event occurring in "those days" is extracted as will be described later. Here, the date on which image data selected by the user was taken by shooting is assumed as a reference date, and the number of image data taken on this reference date is counted.

For example, under the control of the reproduction control unit 212, the event determination unit 213 designates a reference date and inquires of the attribute management unit 311 about the number of image data taken on the reference date. The attribute management unit 311 extracts the number of image data on the designated date from the attribute count unit 313 and returns the counting result to the event determination unit 213. As a result, the reproduction control unit 212 finds the number of image data taken on the specific date (that is, the reference date).

In the following description, it is assumed that a prescribed value set in advance (the prescribed number of sheets) is 30, and when the number of image data taken on the same date is equal to or greater than the prescribed number of sheets (that is, equal to or greater than 30), the event determination unit 213 assumes this date as a prospective event date. When the reference date is a prospective event date, the number of shots (that is, the number of image data) on dates before and after the reference date is counted under the control of the reproduction control unit 212. When at least one of the dates before and after the reference date is a prospective event date, the reproduction control unit 212 then puts together these consecutive prospective event dates into one event (event date).

The event determination unit 213 obtains pointers for image data taken within a time period determined as one event (during an event time period) from the attribute management unit 311. The event determination unit 213 then notifies the image list management unit 214 of the pointers as well as the event time period. The image list management unit 214 manages the event time period, which it has been notified of, and the pointer for image data relating to the event time period in a list form.

Upon recognizing an event, the event determination unit 213 counts the number of shots on consecutive dates before and after the date of the event. When the consecutive dates before and after the date of the event are prospective event dates, the event determination unit 213 includes these consecutive dates in the event time period. Here, seven days before and seven days after the reference date (that is, predetermined days) are considered to be a prescribed time period, and consecutive prospective event dates within the event time period recognized for the prescribed time period are retrieved as one event time period.

The event determination unit 213 notifies the image list management unit 214 of the event time period added as described above. The image list management unit 214 adds the additional event time period, which it has been notified of, and pointers for image data relating to that event time period to the list and manages them. As a result, a time period for which there is a large number of shots on consecutive dates including a reference date is estimated as a time period for which some event occurred, and image data taken within this time period is collectively extracted.

When a reference date is not a prospective event date, or when a reference date is a prospective event date but both of dates before and after the reference date are not prospective event dates, a prospective event date closest to the reference date in a prescribed time period including seven days before and seven days after the reference date is retrieved. Then, event search described above is performed using this prospective event date as a reference date.

When an event time period is recognized, a group of image data taken within this event time period is extracted. As a result, an event close to the date on which image data selected first was taken is recognized, and ambiguous designation by date can be supported.

It should be noted that when an event time period is recognized, image data taken on dates outside the event time period is not extracted. Further, when no event time period is recognized from a prescribed time period including seven days before and seven days after a reference date, a time period longer than the prescribed time period is set as a routine time period with no event. Then, image data in the routine time period is extracted. The extracted image data is not considered to be image data taken in the event time period and treated separately from image data taken in the event time period.

Figure 3:
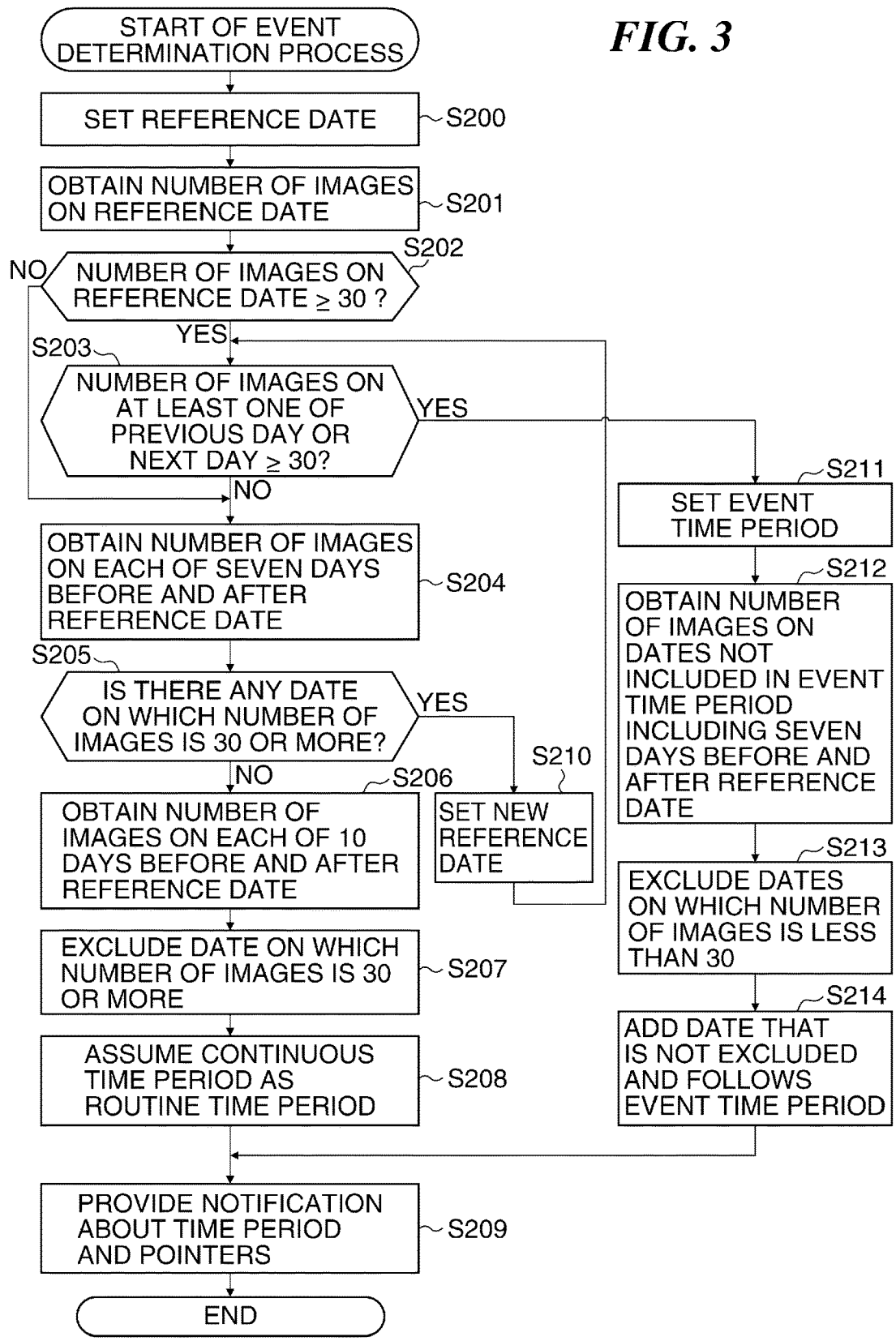
FIG. 3 is a flowchart useful in explaining an exemplary event determination process carried out in the camera in FIG. 1.

FIG. 3 is a flowchart useful in explaining an exemplary event determination process carried out in the camera in FIG. 1. It should be noted that processes in the flowchart in FIG. 3 are carried out by the event determination unit 213 under the control of the reproduction control unit 212.

When the event determination process is started, and the user selects image data (hereafter also referred to merely as an image), the event determination unit 213 sets a shooting date on which the selected image was taken as a reference date and performs event search (step S200). The event determination unit 213 then inquires the attribute management unit 311 about the number of images taken on the reference date and obtains the number of images taken on the reference date (step S201). The event determination unit 213 then determines whether or not the number of images taken on the reference date is equal to or greater than 30. It should be noted that although as described above, it is assumed that the prescribed value of the number of images on the shooting date assumed as a prospective event date is 30, the prescribed value may be any other value.

When the number of images taken on the reference date is equal to or greater than 30, this means that the reference date is a prospective event date (YES in step S202), and hence the event determination unit 213 obtains the number of images taken on the day before (one day before) the reference date and the number of images taken on the day after (one day after) the reference date from the attribute management unit 311. The event determination unit 213 then determines whether or not the number of images taken on at least one of the day before the reference date and the number of images taken on the day after the reference date is equal to or greater than 30 (step S203).

When the number of images taken on each of the day before the reference date and the day after the reference date is smaller than 30 (NO in the step S203), the event determination unit 213 determines that the reference date is not included in an event time period and obtains the number of images taken on each of seven days before and seven days after the reference date from the attribute management unit 311 (step S204).

It should be noted here that seven days before and seven days after the reference date are considered to be a prescribed time period, but the number of days in the prescribed time period may be varied. When the event determination unit 213 determines that the number of images taken on the reference date is smaller than 30 (NO in the step S202), the process proceeds to the step S204.

The event determination unit 213 then determines whether there is any date on which 30 or more images were taken (that is, a prospective event date) within the prescribed time period (step S205). In the process in the step S205, when there is no prospective event date within the prescribed time period or when there are prospective event dates but they are not two or more consecutive dates, the event determination unit 213 determines that no event occurred in the prescribed time period centered on the reference date.

Upon determining that no event occurred in the prescribed time period centered on the reference date (NO in the step S205), the event determination unit 213 changes the prescribed time period to ten days before and after the reference date and obtains, the number of images on dates for which the number of images has not yet been obtained in the changed prescribed time period from the attribute management unit 311 (step S206). The event determination unit 213 then excludes dates on which 30 or more images were taken within ten days before and after the reference date (that is, the changed prescribed time period or the extended prescribed time period) (step S207).

The event determination unit 213 assumes consecutive days among dates that were not excluded in the step S207 as a "routine time period" (step S208). On this occasion, when there is a plurality of continuous time periods, the event determination unit 213 assumes a continuous time period close to the reference date as the routine time period.

The event determination unit 213 then obtains pointers for images taken in the routine time period from the attribute management unit 311 and notifies the image list management unit 214 of the pointers as well as the routine time period (step S209). The event determination unit 213 then terminates the event determination process. It should be noted that the image list management unit 214 manages a routine time period, which it has been notified of, and pointers for images taken in the routine time period in a list form.

On the other hand, upon determining in the step S205 that an event occurred in the prescribed time period centered on the reference date (YES in the step S205), that is, when there is a date on which 30 or more images were taken, the event determination unit 213 sets this date as a new reference date (step S210). After the event determination unit 213 sets the new reference date, the process returns to the step S203, in which the event determination unit 213 then determines the number of images before and after the new reference date. It should be noted that in the process in the step S205, when there is a plurality of dates on which 30 or more images were taken, the event determination unit 213 selects a date close to the original reference date as a new reference date.

In the step S203, when the number of images taken on each of the day before the reference date and the day after the reference date is equal to or greater than 30 (YES in the step S203), the event determination unit 213 assumes consecutive dates including the reference date and the date on which 30 or more images were taken before or after the reference date as an event time period (step S211). Namely, two days consisting of the reference date and the date before the reference date, two days consisting of the reference date and the date after the reference date, or three days consisting of the reference date and the dates before and after the reference date is an event time period.

The event determination unit 213 then assumes seven days before and seven days after the reference date as a prescribed time period and obtains the number of images taken on days which are not included in the event time period from the attribute management unit 311 (step S212). The event determination unit 213 then checks the obtained number of images with respect to each date and excludes dates on which the number of taken images is smaller than 30 (step S213).

Next, when there is any date following the event time period determined in the step S211 among dates remaining without being excluded, the event determination unit 213 adds this date to the event time period (step S214). After that, the process proceeds to step S209, in which the event determination unit 213 obtains pointers for images taken in the event time period from the attribute management unit 311 and notifies the image list management unit 214 of the pointers as well as the event time period. It should be noted that the image list management unit 214 manages an event time period which it has been notified of and pointers for image data in this event time period in a list form.

When as a result of the process described above, it is determined that the shooting date is not included in the event time period or the routine time period, only images taken on the reference date are listed. By the procedure described above, the event determination process is carried out to create a list of taken images. It should be noted that a control unit, not shown, may perform the same operation as operation performed by the event determination unit 213 described above.

FIG. 4 is a diagram showing an arrangement of data managed by the attribute management unit 311 in FIG. 1. For all of image data stored in the image holding unit 310, the attribute management unit 311 manages the number of image data and pointer information for accessing the image data with respect to each attribute. There is a plurality of attributes, and the attribute management unit 311 manages at least one data table shown in FIG. 4 with respect to each of the attributes. Here, as described above, the date on which an image is taken is assumed as a main attribute, and hence in the following description, it is assumed that the date on which an image is taken is an attribute.

The example shown in FIG. 4 is a data table relating to images taken on a certain day. This data table has a variable length, and there is a series of data with 4 bytes per item. A date data (date) 300 is stored in the data table. The date data 300 is stored at the top of the data table, and by reading 4 bytes from the top of the data table, a shooting date is obtained.

An image count data (count) 301 represents the number of images taken on the date indicated by the date data 300. The image count data 301 is stored 4 bytes ahead of the top of the data table, and by reading 4 bytes with a 4-byte offset from the top of the data table, the number of images is obtained.

Pointers 302 to 304 are for use in accessing images, and here, the pointers 302 to 304 corresponding in number to the number of images and having 4 bytes per image are stored in a sequence. The pointer 302 is stored 8 bytes ahead of the top of the data table, and is obtained by reading 4 bytes with an 8-byte offset from the top of the data table. Then, the pointers 303 and 304 for successive images are obtained by reading 4 bytes for each successively from the pointer 302.

As described earlier, the data length of the data table varies with the number of images, but since a pointer for an image has a length of 4 bytes per image, and there are pointers corresponding in number to the number of images stored in the image data count 301, the data length can be calculated. By managing the data table with the data structure described above, the attribute management unit 311 provides the event determination unit 213 with the number of images taken on a designated date in response to a request (designated date) from the event determination unit 213.

FIG. 5 is a view showing an exemplary UI (user interface) screen displayed on the display unit of the camera in FIG. 1. In FIG. 2 referred to earlier, there is shown an exemplary screen displayed on the display unit 400 when the camera lies in the reproducing mode, and here, it is assumed that one image stored in a memory card is being displayed on the display unit 400.

As described with reference to FIG. 2, when the left button of the cross button 404 is depressed while one image is being displayed on the display unit 400, the reproduction control unit 212 switches the display image to an image taken on an earlier shooting date and time. On the other hand, when the right button is depressed, the reproduction control unit 212 switches the display image to an image taken on a later shooting date and time. Continuously depressing the right or left button brings the reproduction control unit 212 into a so-called key repeat state, in which it continuously switches images while the right or left button is being depressed.

When the MENU button 405 is depressed, the reproduction control unit 212 displays a menu (not shown) on the display unit 400. When the user selects a date from the menu, the reproduction control unit 212 switches to an image on the selected date and displays this image on the display unit 400.

By performing any of the operations described above, the user selects an image of which shooting date is desired to be used as a reference date for event determination and displays this image on the display unit 400. Thereafter, when the user depresses the START button 403, the event determination unit 213 starts the event determination process using the shooting date of the image being displayed as the reference date. The event determination unit 213 then performs event determination in the process described above with reference to FIG. 3. When the event determination process is completed, the reproduction control unit 212 displays, for example, the screen in FIG. 5 on the display unit 400. It should be noted that the screen in FIG. 5 varies to a degree according to the result of the event determination process.

Referring to FIG. 5, when the event determination unit 213 determines that there is an event, the reproduction control unit 212 highlights an event icon 411 displayed on the display unit 400. On the other hand, when the event determination unit 213 determines that there is no event and there is a routine time period, the reproduction control unit 212 highlights a routine icon 410 displayed on the display unit 400. When the event determination unit 213 determines that there is neither an event nor a routine time period, the reproduction control unit 212 highlights a this-day icon 412 displayed on the display unit 400.

In the example shown in FIG. 5, the event icon 411 is highlighted, and in this case, the reproduction control unit 212 displays an operating guidance saying that "an event will be reproduced" in a lower part of the display unit 400. It should be noted that a SET icon 413 and a MENU icon 414 are displayed on the display unit 400 shown in the figure.

When the user depresses the SET button 406 while the SET icon 413 is displayed, the reproduction control unit 212 starts image reproduction. When the user depresses the MENU button 405 while the MENU icon 414 is displayed, the reproduction control unit 212 returns to the previous screen in FIG. 2 without starting image reproduction.

As shown in FIG. 5, when the user depresses the SET button 406 while the event icon 411 is being highlighted, the reproduction control unit 212 starts reproducing a group of images extracted as an event as a result of event determination. When the user depresses the SET button 406 while the routine icon 410 is being highlighted although this is not illustrated in the figure, the reproduction control unit 212 starts reproducing a group of images extracted as a routine time period as a result of event determination. When the user depresses the SET button 406 while the this-day icon 412 is being highlighted, the reproduction control unit 212 starts reproducing a group of images taken on a reference date for event determination as a result of event determination.

FIGS. 6A to 6C are views useful in explaining exemplary results of event determination performed in the camera in FIG. 1, in which FIG. 6A is a view showing a first example of event determination results, FIG. 6B is a view showing a second example of event determination results, and FIG. 6C is a view showing a third example of event determination results. It should be noted that although in the above description, a prescribed time period is a total of 15 days centered on a reference date and including 7 days before and after the reference date, but in FIGS. 6A to 6C, a prescribed time period is a total of 7 days centered on a reference date and including 3 days before and after the reference date. In FIGS. 6A to 6C, a reference date for event determination is designated by M.

In the example shown in FIG. 6A, the number of images (that is, the number of shots) on a reference date M is 31, and hence the reference date M is a prospective event date. Shooting dates (M−1) and (M+1) which are dates before and after the reference date M are prospective event dates, and thus three dates consisting of the shooting date (M−1), the reference date M, and the shooting date (M+1) are an event time period.

Further, as for consecutive days in the event time period, the number of shots on a shooting date (M−2) is 28, and hence this shooting date (M−2) is not a prospective event date. Thus, in a past direction, event determination ends here. The starting date of the event is the shooting date (M−1). On the other hand, in a future direction, a shooting date (M+2) is a prospective event date, but a shooting date (M+3) is not a prospective event date. Thus, in the future direction, event determination ends on the shooting date (M+3), and the end date of the event is the shooting date (M+2). As a result, ultimately, four dates from the shooting date (M−1) to the shooting date (M+2) is an event time period.

In the example shown in FIG. 6B, a reference date M is not a prospective event date. Thus, when shooting dates (M−1) and (M+1) which are dates before and after the reference date M are checked so as to search for a new reference date, it is found that the shooting date (M−1) is not a prospective event date, but the shooting date (M+1) is a prospective event date. Thus, the shooting date (M+1) is a new reference date here.

As shown in the figure, since shooting dates (M+2) and (M+3) are prospective event dates, and this means that there are consecutive prospective event dates. A shooting date (M+4) is not a prospective event date, and hence three dates from the shooting date (M+1) to the shooting date (M+3) is an event time period. In the example shown in the figure, the event time period includes the first (original) reference date M.

In the example shown in FIG. 6C, there is no prospective event date within the prescribed time period. Thus, there is no event here. Since shooting dates that are not prospective event dates are in succession, they are a routine time period.

Although not shown in FIGS. 6A to 6C, when shooting dates that are prospective event dates and shooting dates that are not prospective event dates are on alternate days, there is neither an event time period nor a routine time period. In this case, as described above, only a reference date is assumed as a date targeted for image extraction.

Although in the embodiment described above, the basic event determination method is used, it will be more effective to change methods for reproducing an image group, which is extracted according to an event determination result, depending on an event time period or a routine time period.

For example, when as a result of event determination, it is determined that there is an event, the number of images to be extracted is expected to be greater than that in a routine time period (that is, in a case where it is determined that there is no event). For this reason, when it is determined that there is an event, it will take a lot of time to reproduce all of extracted images. Thus, when it is determined that there is an event, the reproduction control unit 212 makes the time period for which one image is displayed shorter than in a routine time period so that images can be switched at a fast pace.

On the other hand, in a routine time period, the reproduction control unit 212 makes the time period for which one image is displayed longer than in a case where it is determined that there is an event, thus switching images at a slow pace. Thus, the effect of image reproduction due to event determination is enhanced.

Moreover, although in the embodiment described above, when a reference date is not a prospective event date, a prospective event date close to the reference date is retrieved and set as a new reference date, when a new reference date is determined, a shooting date on which the number of shots is the largest may be set as a new reference date. Further, when the length of an event time period varies by reference date, a reference date for a longer event time period may be set as a new reference date.

Further, in the embodiment described above, as a condition for a prospective event date, the prescribed value of the number of shots is set at 30, and a shooting date on which the number of shots is 30 or more is assumed as a prospective event date. On the other hand, the prescribed value may be varied according to other attributes of an image selected to determine a reference date. For example, with the assumption that the number of shots taken by a user who takes pictures of children tends to be large, when an image selected first is a picture of a child, the prescribed value is set to be greater than an usual value. This prevents an unnecessarily large number of images from being extracted according to an event determination result.

As described above, according to the embodiment of the present invention, a reference date is designated by the user selecting one image, and an event is searched for based on the reference date to extract a group of images relating to the event. As a result, the user easily reproduces images intended for viewing without performing complicated operations.

The present invention may be implemented even by an apparatus having an arrangement different from the present embodiment, for example, an apparatus having a recording and reproducing unit that reproduces image data recorded on a recording medium, a display control unit that displays an image of image data reproduced by the recording and reproducing unit, and a control unit that controls them.

It should be noted that the recording medium is, for example, a semiconductor memory such as a memory card, and the recording and reproducing unit is a card interface that reads and writes data from and into a memory card. The display unit is, for example, a liquid crystal display or an organic EL display, and the display control unit is a display driver that displays an image corresponding to input image data on the display unit.

The control unit is comprised of a CPU and memory and has a function of controlling the entire image pickup apparatus. The process in the flowchart of FIG. 3 may be carried out by the control unit. In this case, as for information on a shooting date, for example, the record reproducing unit is controlled to reproduce a management file in which file headers of image files recorded in the recording medium and information on the image files are collected. Based on dates on which image data were taken, the process in the flowchart of FIG. 3 is carried out to identify images to be displayed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-269331, filed Dec. 26, 2013, which is hereby incorporated by reference herein in its entirety.

What is claimed is:

1. An image reproducing apparatus for identifying target images, the apparatus comprising:
   a memory; and
   a processor connected to the memory and configured to execute:
      a read-out task that reads out a plurality of images recorded in a recording medium; and
      a control task that:
         automatically determines a time period corresponding to an event based at least on a reference date by identifying at least one other shooting date, directly consecutive to the reference date, where at least a predetermined number of images were taken on each date of the reference date and the at least one other directly consecutive shooting date;
         identifies images, from among the plurality of images, taken on the reference date and the at least one other directly consecutive shooting date of the determined time period corresponding to the event as the target images; and
         does not identify images taken on shooting dates outside the reference date and the at least one other directly consecutive shooting date of the determined time period corresponding to the event as the target images,
         wherein the predetermined number is a plural number, at least ten, for determining an event.

2. The image reproducing apparatus according to claim 1, wherein the control task determines the time period based on shooting dates on which at least the predetermined number of images were taken for predetermined dates or longer and determines images taken within the determined time period as the target images.

3. The image reproducing apparatus according to claim 1, wherein the control task determines the time period based on shooting dates on which at least the predetermined number of images were taken in a predetermined time period including the reference date.

4. The image reproducing apparatus according to claim 3, wherein in the predetermined time period, when a shooting date on which at least the predetermined number of images were taken does not exist, the control task determines images taken within the predetermined time period as the target images.

5. The image reproducing apparatus according to claim 1, wherein the processor is further configured to execute a selection task that permits a user to select the reference date.

6. The image reproducing apparatus according to claim 5, wherein the selection task permits the user to select one image among the plurality of images recorded in the recording medium, and a shooting date on which the image selected by the selection task was taken is set as the reference date.

7. The image reproducing apparatus according to claim 1, wherein the processor is further configured to execute a processing task that performs a predetermined process on the target images.

8. The image reproducing apparatus according to claim 7, wherein the predetermined process includes automatically reproducing the target images.

9. The image reproducing apparatus according to claim 7, wherein the predetermined process includes selecting image to be successively reproduced among the target images.

10. The image reproducing apparatus according to claim 1, wherein the control task determines the target images as images relating to the reference date.

11. The image reproducing apparatus according to claim 1, wherein the predetermined number is 30 or more.

12. An image reproducing apparatus for identifying target images, the apparatus comprising:
- a memory; and
- a processor connected to the memory and configured to execute:
    - a selection task that selects one image from a plurality of images recorded in a recording medium as a reference image; and
    - a determination task that automatically determines an event time period relating to the selected reference image based on a shooting date on which the selected reference image was taken and identifies the target images from among the plurality of images recorded in the recording medium based on the determined event time period,
    - wherein, where at least a predetermined number of images taken on the shooting date of the selected reference image are included in the plurality of images recorded in the recording medium, the determination task determines the event time period by including the shooting date of the reference image and at least one other shooting date, which is directly consecutive to the shooting date of the reference image and where at least the predetermined number of images were taken on the shooting date of the selected reference image and the at least one other shooting date directly consecutive to the shooting date of the reference image, as the event time period,
    - wherein images taken on shooting dates outside the shooting date of the reference image and the at least one other shooting date directly consecutive to the shooting date of the selected reference image of the determined event time period are not determined as the target images, and
    - wherein the predetermined number is a plural number, at least ten, for determining an event.

13. The image reproducing apparatus according to claim 12, wherein the determination task determines the event time period within a predetermined time period following the shooting date of the selected image.

14. A control method for an image reproducing apparatus, the control method comprising:
- reading out a plurality of images recorded in a recording medium;
- automatically determining a time period corresponding to an event based at least on a reference date by identifying at least one other shooting date directly consecutive to the reference date, where at least a predetermined number of images were taken on each date of the reference date and the at least one other directly consecutive shooting date;
- identifying images, from among the plurality of images, taken on the reference date and the at least one other directly consecutive shooting date of the determined time period corresponding to the event as the target images; and
- not identifying images taken on shooting dates outside the reference date and the at least one other directly consecutive shooting date of the determined time period corresponding to the event as the target images,
- wherein the predetermined number is a plural number, at least ten, for determining an event.

15. A control method for an image reproducing apparatus, the control method comprising:
- selecting one image from a plurality of images recorded in a recording medium as a reference image; and
- automatically determining an event time period relating to the selected reference image based on a shooting date on which the selected reference image was taken and identifying the target images from among the plurality of images recorded in the recording medium based on the determined event time period,
- wherein, where at least a predetermined number of images taken on the shooting date of the selected reference image are included in the plurality of images recorded in the recording medium, the determination task determines the event time period by including the shooting date of the reference image and at least one other shooting date, which is directly consecutive to the shooting date of the reference image and where at least the predetermined number of images were taken on the shooting date of the selected reference image and the at least one other shooting date directly consecutive to the shooting date of the reference image, as the event time period,
- wherein images taken on shooting dates outside the shooting date of the reference image and the at least one other shooting date directly consecutive to the shooting date of the selected reference image of the determined event time period are not determined as the target images, and
- wherein the predetermined number is a plural number, at least ten, for determining an event.

16. A non-transitory computer-readable storage medium storing a program for causing a computer to implement a control method for an image reproducing apparatus, the control method comprising:
- reading out a plurality of images recorded in a recording medium;
- automatically determining a time period corresponding to an event based at least on a reference date by identifying at least one other shooting date directly consecutive to the reference date, where at least a predetermined number of images were taken on each date of the reference date and the at least one other directly consecutive shooting date;
- identifying images, from among the plurality of images, taken on the reference date and the at least one other directly consecutive shooting date of the determined time period corresponding to the event as the target images; and
- not identifying images taken on shooting dates outside the reference date and the at least one other directly consecutive shooting date of the determined time period corresponding to the event as the target images, wherein the predetermined number is a plural number, at least ten, for determining an event.

17. A non-transitory computer-readable storage medium storing a program for causing a computer to implement a control method for an image reproducing apparatus, the control method comprising:
selecting one image from a plurality of images recorded in a recording medium as a reference image; and
automatically determining an event time period relating to the selected reference image based on a shooting date on which the selected reference image was taken and identifying the target images from among the plurality of images recorded in the recording medium based on the determined event time period,
wherein, where at least a predetermined number of images taken on the shooting date of the selected reference image are included in the plurality of images recorded in the recording medium, the determination task determines the event time period by including the shooting date of the reference image and at least one other shooting date, which is directly consecutive to the shooting date of the reference image and where at least the predetermined number of images were taken on the shooting date of the selected reference image and the at least one other shooting date directly consecutive to the shooting date of the reference image, as the event time period,
wherein images taken on shooting dates outside the shooting date of the reference image and the at least one other shooting date directly consecutive to the shooting date of the selected reference image of the determined event time period are not determined as the target images, and
wherein the predetermined number is a plural number, at least ten, for determining an event.

* * * * *